United States Patent
Harris

(10) Patent No.: US 8,711,287 B2
(45) Date of Patent: *Apr. 29, 2014

(54) ASPECT RATIO ENHANCEMENT

(75) Inventor: Scott C. Harris, Rancho Santa Fe, CA (US)

(73) Assignee: Harris Technology, LLC, Rancho Santa Fe, CA (US)

( * ) Notice: Subject to any disclaimer, the term of this patent is extended or adjusted under 35 U.S.C. 154(b) by 225 days.

This patent is subject to a terminal disclaimer.

(21) Appl. No.: 13/169,974

(22) Filed: Jun. 27, 2011

(65) Prior Publication Data
US 2011/0279729 A1    Nov. 17, 2011

Related U.S. Application Data

(63) Continuation of application No. 12/641,016, filed on Dec. 17, 2009, now Pat. No. 7,969,509, which is a continuation of application No. 11/126,492, filed on May 10, 2005, now Pat. No. 7,643,091.

(60) Provisional application No. 60/587,732, filed on Jul. 13, 2004, provisional application No. 60/572,550, filed on May 18, 2004.

(51) Int. Cl.
*H04N 5/46* (2006.01)

(52) U.S. Cl.
USPC ............... 348/558; 348/445; 348/556

(58) Field of Classification Search
USPC ............ 348/445, 615, 626, 673, 687, 569, 348/554–558, 913, 747, 441
IPC ........................ H04N 5/46,5/00, 5/14
See application file for complete search history.

(56) References Cited

U.S. PATENT DOCUMENTS

| | | | |
|---|---|---|---|
| 6,366,706 B1 | 4/2002 | Weitbruch |
| 6,947,097 B1 | 9/2005 | Joanblanq |
| 6,950,114 B2 | 9/2005 | Honda et al. |
| 6,965,415 B2 | 11/2005 | Lundblad et al. |
| 7,126,642 B2 | 10/2006 | Takechi et al. |
| 7,129,992 B2 | 10/2006 | Barnichon |
| 7,209,180 B2 | 4/2007 | Takagi et al. |
| 7,224,401 B2 | 5/2007 | Ackley et al. |
| 7,239,354 B2 | 7/2007 | Moritani |
| 7,643,091 B2 | 1/2010 | Harris |
| 2007/0076020 A1 | 4/2007 | Fleming |

*Primary Examiner* — Trang U Tran
(74) *Attorney, Agent, or Firm* — Law Office of Scott C. Harris, Inc.

(57) ABSTRACT

An adaptive compensation system for aspect ratio conversion. Video information, intended for her first aspect ratio display, e.g. the standard NTSC aspect ratio, is processed to determine additional information that can enable that video to be displayed and fill a wider aspect ratio screen. The processing can be a calculation which calculates, for example, texture, color and/or brightness of the edge portions, and automatically calculates video information to match the texture, brightness or color. The processing can be a database lookup, which automatically looks up likely portions from a database. The processing can also be an adaptive determination of what vertical portions of the image can be stretched without affecting the viewability, and then an adaptive stretching of different portions by different amounts.

15 Claims, 3 Drawing Sheets

ASPECT RATIO ENHANCEMENT

PRIORITY CLAIM

The present application is a continuation application of U.S. Ser. No. 12/641,016 filed Dec. 17, 2009, now U.S. Pat. No. 7,969,509 issued Jun. 28, 2011, which is a continuation application of U.S. Ser. No. 11/126,492 filed May 10, 2005, now U.S. Pat. No. 7,643,091 issued Jan. 5, 2010, which claims priority from provisional application No. 60/587,732 filed Jul. 13, 2004, and from provisional application No. 60/572,550 filed May 18, 2004, the disclosures of which are hereby incorporated by reference.

BACKGROUND

A ratio between the length and width of a video display unit screen is often called the "aspect ratio". Conventional aspect ratios for broadcast NTSC video is a ratio of 4:3. However, modern televisions and video display units are often formed with an aspect ratio of 16:9 or even wider. Certain video programs support this wider aspect ratio. However, a large number of legacy programs are still broadcast and/or otherwise available only in the ratio of 4:3.

In certain modern screens, displaying on only part of the screen can cause problems. Specifically, if one part of the screen is used more than others, then that unused part of the screen may age differently than those other parts. In certain screens this can cause uneven brightness, or other problems which make television viewing experience less enjoyable.

Conversely, simply displaying the program on the screen and leaving black bars or like on sides of the displayed program, may look bad.

Some televisions attempt to obviate his problem by allowing the user to widen the program. However, the program recorded at 4:3 ratio (1.25) is then displayed at a 16.9 or other ratio (wider than 1.25). This makes the objects look out of proportion and funny. This has often been found to be acceptable.

SUMMARY

The present application teaches enhancing use of a video system and its aspect ratio. More specifically, an aspect teaches techniques to facilitate displaying video programs on a video screen which has a different aspect ratio than the ratio for the program was originally intended.

One aspect describes a technique of allowing preparing video display material for a video screen, where the material was intended originally for display on a screen with one aspect ratio, and to be used on video screens of a different aspect ratio.

BRIEF DESCRIPTION OF THE DRAWINGS

These and other aspects will now be described with reference to the accompanying drawings, wherein.

DETAILED DESCRIPTION

One aspect of the present application defines displaying a program which has different length and width characteristics than the video screen which will be displaying that program. This may be used with broadcast media, where the broadcast media is intended to include broadcasts of any frequency, both real-time, and time-shifted, satellite programming, recorded video, as well as any programming over media other than the above.

Figure 1:
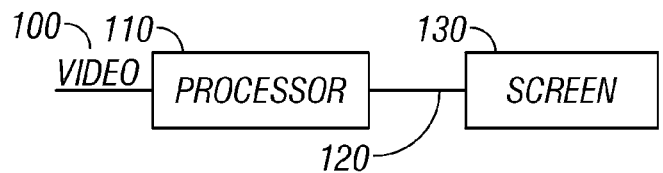
FIG. 1 shows a block diagram of the basic system.

FIG. 1 shows a basic block diagram of the system. Video information 100, from whatever source, is provided to processor 110 which operates to process the video, to either change some aspect of the video, or make a determination of other operations, if any, to take. The processed video 120 is output to a video screen 130 which is shown here as a wide screen system. The embodiment given herein assumes that the video resolutions of 4:3 being displayed on a screen of 16 by 9 aspect ratio. However, it should be understood that any conversion between any two aspect ratios or pixel ratios is alternatively possible.

Figure 2:
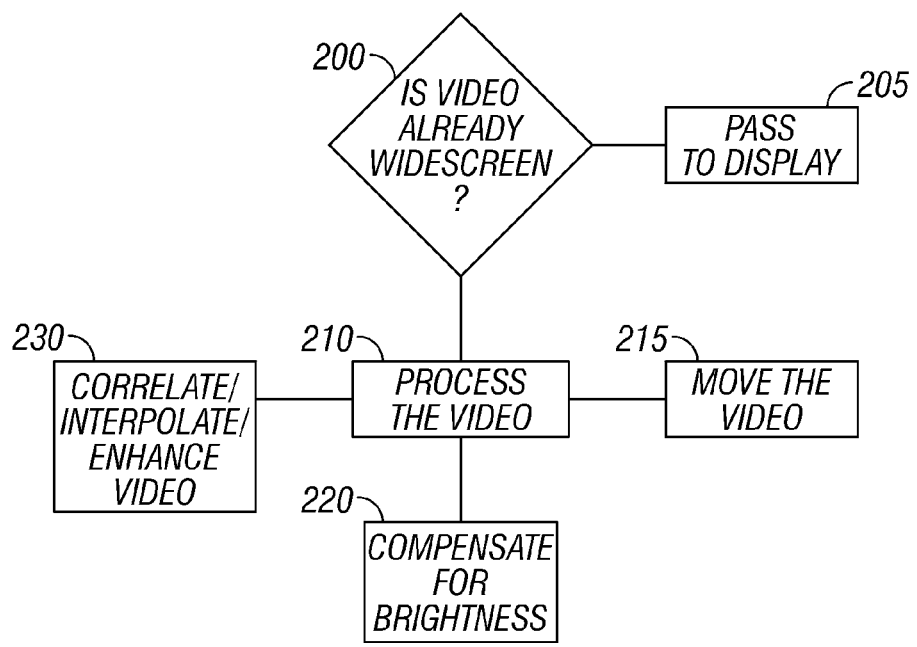
FIG. 2 shows a flowchart of operations.

The video processing element 110 can be a dedicated microprocessor, or can be some kind of hardware processor, or can be dedicated circuitry which carries out the functions described herein. FIG. 2 shows a basic flowchart which is followed by processing circuit 110. At 200, the processing circuit determines if the video source is already widescreen. That is, 200 detects whether the video source coming in is already in the proper format to fit on the wide screen 130. If so, the video source passes the video to the display at 205 without modification.

If not, the processor 110 processes the video at 210. As shown in FIG. 2, three basic kinds of processing are carried out. In the first basic kind of processing at 215, the video is simply moved on the screen, and operations are taken to avoid screen burn in. This may be considered the most rudimentary process, and probably the least desirable from the user's point of view. 220 is an alternative which can be carried out, which calculates and/or compensates for overall brightness. This can be done in conjunction with the other embodiments. The calculation and compensation basically keeps a record of the number of times that each area on the screen has received specified amounts of brightness. Compensation is then carried out to attempt to render the brightness in other portions in a similar way to avoid screen burn in.

230 shows a routine for correlate/interpolate/enhance of the video information. In this embodiment, electronic techniques are carried out to form additional portions for the video content to be displayed to form additional parts of the video. These techniques are described in further detail herein.

Figure 3A:
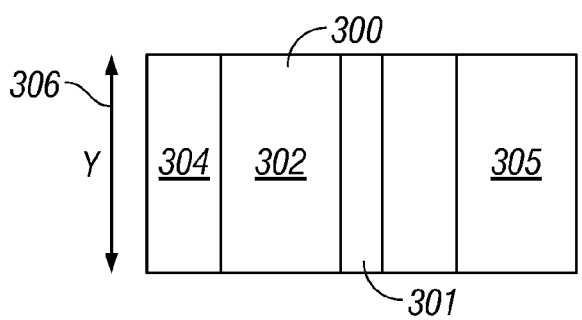
FIGS. 3A-3B show different ways of handling the blank areas in a video screen.

FIG. 3A shows a basic concept of the move routine 215. Basically, the content 300 to be displayed is shown within the outer perimeter 302, leaving blank areas 304, 305. The video portion is moved cyclically back and forth to cycle the location on the screen that contains the blank areas, that is, to cyclically adjust the relative sizes of areas 304 and 305. The picture can be stretched proportionally so that its Y coordinate, shown as 306, fits properly within the screen. The picture is then moved back and forth to reduce the asymmetry in the screen burn in process. Preferably, moving occurs in a way which will not become disconcerting to the user. For example, the picture may be moved very slowly, or moved to a different location only in between scenes, in between shows, or in between watching sessions.

This will still mean that the center portion of the screen will receive display at all times. The total brightness received by the edge portions of the screen will be more even. However, the center portion will always be displaying video, and hence will still receive more total brightness.

Accordingly, another embodiment maintains a table of an amount of brightness received by each portion of the screen over time. Basically, the screen can be divided into slices in the y direction, shown as 309. Each slice, which may be for example ½0th of the screen or ⅒th for the screen, is maintained as a bucket representing the total amount of brightness that has been displayed by that bucket. A number is associated with the bucket, and incremented each time the slice receives a specified amount of brightness.

In another embodiment, the actual average brightness display to the screen is also monitored. When that average brightness integrated over time exceeds a specified amount, the brightness bucket is incremented.

Based on the brightness bucket, compensation for brightness can be carried out. Different brightness compensations which attempt to make sure that the screen is evenly used may include the following. In one aspect, the edges of the screen may be slightly brightened as compared with the center, during normal play. Preferably that brightening is by an amount which will not be noticed by the user or negligibly noticed by the user. For example, it is believed that a 20% brightness increase might not be noticed as undesirable by the user. Another brightness compensation alternative is to provide picture to the edge portions which require compensation, during times in the television is not in use. For example, the user can be informed of the fact that a brightness compensation routine needs to be carried out, and asked for a time when they will not be in the room, during which the compensation can be carried out. For example, during the day when the television is not being used, most users will probably not find it objectionable to display white bands on the sides in order to compensate in this way. Another aspect provides a motion or heat sensor in the room, to sense when the room is empty of people, using conventional motion sensor techniques. The compensation can be carried out when the room does not have people therein. The compensation carried out during this time can be of any desired type, since the room will presumably not be observed by any people during this time.

One alternative operation may display closed captions in the side bars, instead of over the picture as conventional. This may be combined with the picture moving embodiment and/or the average brightness monitoring embodiments, as disclosed above.

Figure 3B:
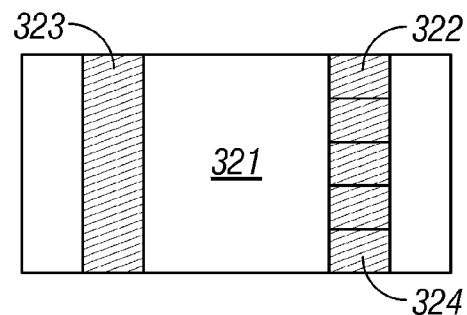

FIG. 3B shows a first of the correlated interpret enhance routines in which edge portions 320 are compensated using the content of the picture portion 321. First, the portion at the edge 322, 323 of the picture portion 321 is analyzed. This may be the edge 20%, edge 10% or even the edge 5% of the content. Alternatively, this may be the entire pixel content or may be only a few pixels. However analyzed, this edge portion 322 is used to form a supplemental video portion which will be used at the edge portion 322 to match to the existing video image.

One aspect may match the median color. The median color here is defined as the color pixel which is found most often in a specified portion. Another aspect may include matching the average brightness, that is the average luminance of the areas. This area 322 may be matched, as shown, in different bucket portions. In one aspect, a bucket may be a square neighborhood, where the width of the areas 322 also defines its height, shown as 324. However, the buckets can be of any shape; the matching can be carried out over the entire y direction, or may be carried out over different portions at different times.

Figure 4A:
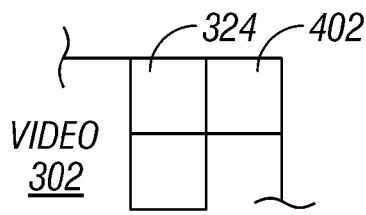
FIG. 4A-4D illustrate different interpretation techniques.

FIGS. 4A-4D shows the operation of the enhancing and interpolating the image to form edge portions. FIG. 4A, the first bucket 324 is evaluated, as described above, interpreted to determine the second bucket 402 which has similar image characteristics to the first bucket.

Figure 4B:
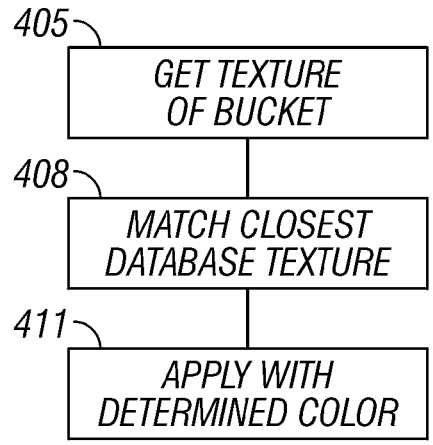

FIG. 4B describes a database approach. According to FIG. 4B, the system maintains a database of usually used television program textures. The texture of the area 324 is found at 405. That texture is matched to one of the commonly-used textures at 408. Once that texture is found, that texture is applied to the area 402 at 411. The texture may be used along with average color, median color as described above, and/or average brightness taken from the bucket 324. Preferably however, the median color of the bucket 324 and the average brightness of the bucket 324 is used to set the same parameters in area 402.

Figure 4C:
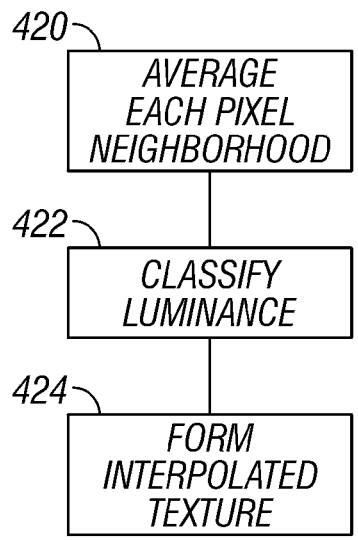

FIG. 4C represents a system of extracting the actual texture, that is a pattern within the image defined by the area 400.

FIG. 4C shows analyzing a neighborhood 324, and individual pixel parts within that neighborhood. For example, each block of 4×4 pixels within the area 324 may be characterized. Each 4×4 neighborhood 324 is averaged at 420. Each 4×4 neighborhood is then classified for luminance, e.g., between the values zero and 7 at 422, that is for example zero being least bright and seven being the most bright. This classification simply coarsely classifies each pixel luminance. The values are used to form that texture, with each bit portion in the texture being represented by a value between zero and seven representing an average luminance. That texture is then used as the interpolated texture 424, either exactly as it is, or after left to right inversion.

The above has described substantially simplifying the amount of data which is stored for the texture, both by simplifying that number of luminance values that are stored, and simplifying the total number of pixel values which are stored. However, it should be understood that the raw data can be obtained without simplification. The simplification, however, may allow the processing to the carried out more effectively.

Figure 4D:
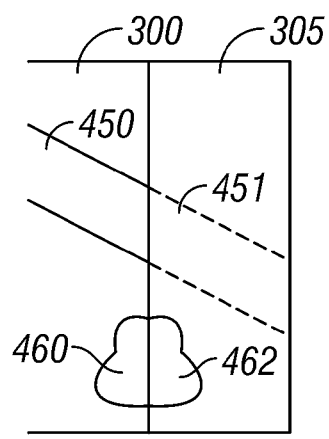

FIG. 4D depicts finding basic shapes within the portion 400. Here, the video 444 includes a line in area 450, and a geometrical area 460. In this embodiment, the processing finds certain basic shapes using a shape recognition algorithm as known in the art. The interpolation then computes the basic shape beyond the edge of the video; for example, the basic shape 450 is completed as shape envelope 451. The basic shape 460 may simply be mirrored to form the shape 462 as a mirrored portion of the shape 460. When a known shape is found at the edge, that known shape is simply continued; when an unknown non regular or non-known shape is found, that shape may also be mirrored. Of course, other more advanced shape matching algorithms can also be used in an analogous way.

Figure 5A:
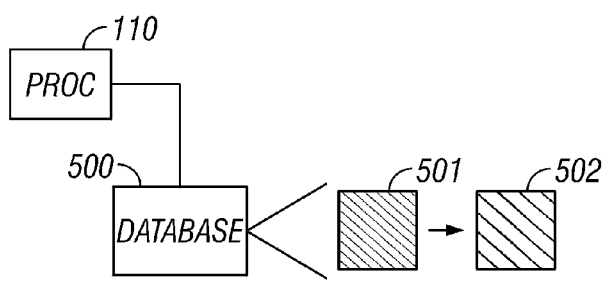
FIGS. 5A-5C illustrate separate data display techniques.
Figure 5B:
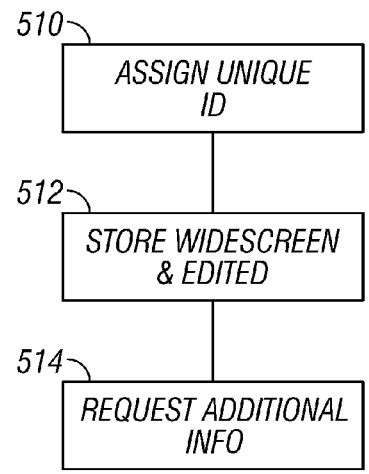
Figure 5C:
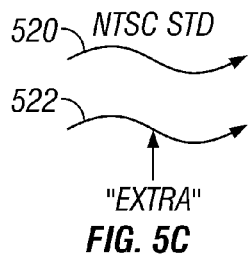

FIGS. 5A-5C represent an embodiment where the extra information is not calculated, but is rather obtained. In FIG. 5A, a database 501 of "additional information" represented in FIG. 4A as area 402, is maintained. FIG. 5A shows this database as being coupled to processor 110, which coupling can be a wired connection, or wireless, or over the channel that carries the video. Database 500 can be maintained at a central location, or within the television itself. That information states that given a basic portion of x shown as 501, you are likely to have an extended portion of 502.

Many of the programs which are broadcast or available in 4:3 broadcast resolution are actually programs which have more information associated with them, but which have been truncated to fit within the NTSC standard broadcast. For example, many movies and other shows are "edited for television", meaning that the enhanced aspect ratio portions have been removed. The database may represent how the average editing of this type occurs, or may be a database of precompiled information of the type described above in FIG. 4A-4D.

FIG. 5B shows a flowchart of storing and reconstituting the actual information that is removed during editing. That additional information, removed when the show has been edited for television, is sent to the television in a separate way. In the FIG. 5B embodiment, for example, each show is assigned a unique identifier at 510. The widescreen information is stored separately from the narrow (edited) screen information at 512. The user (or television automatically) can request at 514 that additional information which is sent over the cable channel that is the communication channel or sent over a network. In this way, the actual additional information can be sent separately from the television show. This can be done as a for pay arrangement, for example, the television stations can send the additional information on a per use basis, or including commercials therein.

FIG. 5C shows yet another embodiment in which the widescreen information is sent totally separately from the NTSC standard information. The widescreen information may be sent over a separate channel over the Internet or over a broadcast channel of different type. The widescreen information can be sent, for example, as Digital compressed video. The Digital compressed video, for example in MPEG4 format, is then decoded by the television and in is displayed as the additional information. FIG. 5C shows the NTSC standard information 520 being sent separately from the "extra" information 522 used to produce the edge portions 304, 305.

In an alternative embodiment, the edge portions, which would otherwise be blank, may be used for additional textual information. For example, they can be used for closed captions, foreign translations into alternative languages, or other notes or supplemental information. It may be advantageous when the extra portions are being used for textual annotations of this type, for the video to the pinned against either the left or the right side of the screen. This may be used with a variant of the FIG. 3A embodiment, in which the video is first displayed against a left side of the screen, and subsequently displayed against the right side of the screen.

The above has described some basic techniques, but it should be understood that other modifications in the above are possible. One primary modification which is intended is that this system be usable with other forms of video distribution, such as video over IP, and video over any other channel.

Another aspect is explained with reference to FIGS. 6A-6C. One problem with stretching the aspect ratio is that certain things will look unnatural when stretched. A person who is stretched in the vertical direction obtains a totally different look, and often has a shape that looks unnatural. According to this embodiment, different portions of the screen are analyzed, and it is determined whether these portions of the screen are other types which can be stretched horizontally without distorting. For example, a person cannot be stretched significantly in the horizontal direction, without being distorted by the stretching operation. The adaptive stretching classifies the objects about whether they can be stretched or not.

Figure 6A:
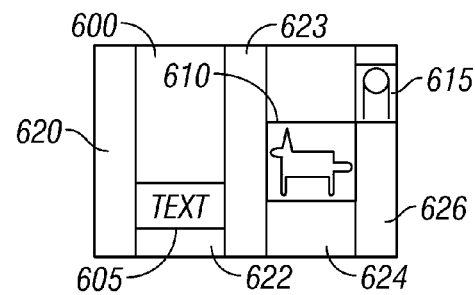
FIGS. 6A-6C illustrate adaptive compensation of the images

FIG. 6A illustrates an exemplary image 600 which is to be displayed on the screen of the television. While this image is depicted as being an image format, it should be understood that the image could be manipulated by the processor while the image is still present as a digital signal. Different portions within the image are classified. For example, the image shown in FIG. 6A has text portions 605, another portion showing a cat 610, and yet another portions 615 showing a stool. Each of these objects 605, 610, 615 are classified. A decision is made for each object individually as to whether the object will look distorted when stretched horizontally.

The screen is then divided into vertical sections, with certain vertical sections such as 620 having no objects therein, and therefore presumably being only background. Other vertical sections such as 622 include text only. Still another vertical section 624 includes an animate object and 626 includes an inanimate object.

The vertical sections are classified as to whether they can be stretched without distortion or not. The slices such as 620 and 623 which include only background or textures therein can certainly be stretched. Portions with text only can be stretched such as 622. In general, inanimate objects such as present in slice 626 can be stretched, while animate objects such as present in slice 624 cannot be stretched. The slices which can be stretched are stretched by the desired amount forming a widened aspect ratio in which the slice 624 is maintained as not stretched, but slices such as 626 are stretched. The slices such as 623 which include text are also stretched, as is the slice 622 which includes text.

Figure 6B:
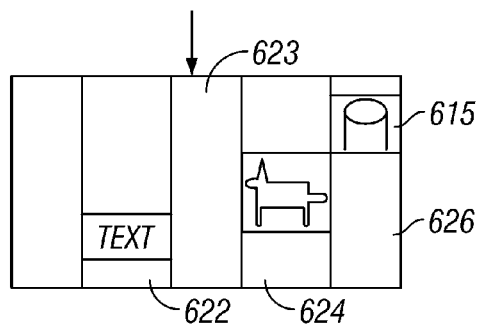
Figure 6C:
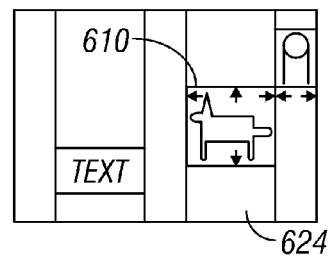

FIG. 6B shows the result of the adaptive stretching in which certain items, here are the ones with inanimate objects and text, are stretched (in the direction parallel to the horizontal plane), but other items, here the ones with animate objects are not stretched.

This may work fine in certain circumstances, but may distort the perspective of the scene. For example, it can be seen in FIG. 6A that the cat in 610 is very close to the text 605. However, in FIG. 6B, the cat is much further from the text 622. This may create distortions in the field of the picture. For example, if the cat starts walking towards the text, the successive frames will be compensated in a similar way to that discussed above, making the cat's walking seen unnaturally fast. FIG. 6C illustrates an embodiment with object based stretching. In FIG. 6C, each slice is stretched by the same percentage stretch. Therefore, all of the slices become wider proportionally. However, rather than changing the aspect ratio of the unstretchable objects, the other stretchable objects are adjusted not only in the vertical direction but also in the horizontal direction. Therefore, the cat in 610 is stretched in both vertical and horizontal directions so that its vertical to horizontal ratio is maintained constant. Slice 624 is still stretched, but is stretched without distorting the animate object 610. In contrast, the other objects, such as the object 615 is stretched vertically only since the vertical stretching will not affect these objects. In summary then, the embodiment of FIG. 6C classifies each object as to whether it can be stretched or not, forms and vertical strips with each vertical strip encompassing and object, and determines the way in which the vertical strip should be stretched based on the object within the vertical stretch.

Multiple objects may be within a single vertical strip, and these multiple objects may be handled differently. For example, a strip which includes both animate and inanimate objects would not be stretched in the FIG. 6B embodiment, but would be partly stretched in the FIG. 6C embodiment so that only the objects 610 would be stretched horizontally, while other objects which are inanimate would be stretched only vertically and have their length to width ratios altered appropriately.

Although only a few embodiments have been disclosed in detail above, other modifications are possible, and this disclosure is intended to cover all such modifications, and most particularly, any modification which might be predictable to a person having ordinary skill in the art. For example, while the above has described a processor operating according to a flowchart, it should be understood that this can be done by a DSP, or by FPGAs, or any other structure that can process information. This can also be done by a "shader" in the video processing hardware.

Also, only those claims which use the words "means for" are intended to be interpreted under 35 USC 112, sixth paragraph. Moreover, no limitations from the specification are intended to be read into any claims, unless those limitations are expressly included in the claims.

What is claimed is:

1. An apparatus, comprising:
a display, and a processing element, which receives video information as an input thereto, said video information having a first ratio between length and width of the video information, and said processing element operating to automatically determine additional video information for display on the display with a second, different ratio between length and width than said first ratio, wherein said processing element processes at least a portion of the video information to determine information indicative of at least a first characteristic of the video information in at least said portion, said first characteristic being a viewable characteristic that effects the look of the video information when displayed, and where said processing element automatically determines said additional video information having a determined characteristic related to said information indicative of said at least said first viewable characteristic, wherein said first characteristic is a first texture in at least said portion, and where said processing element automatically determines said additional video information having a determined texture related that matches to said first texture.

2. An apparatus as in claim 1, wherein said first characteristic is a first color in at least said portion, and where said processing element automatically determines said additional video information having a determined color related to said first color.

3. An apparatus as in claim 2, wherein said additional video information matches to a median color which is found most often in said portion.

4. An apparatus as in claim 1, wherein said additional video information is selected that has the same average luminance as said first texture.

5. An apparatus as in claim 1, wherein said processing element obtains said additional video information by calculating an average luminance value representative of said additional video information based on said information indicative of said viewable characteristic.

6. An apparatus as in claim 1, wherein said processing element obtains said additional video information by accessing a database of additional video information using said information indicative of said viewable characteristic, said additional video information being selected by said processing element from said database based on said information indicative of said viewable characteristic.

7. An apparatus as in claim 6, wherein said database includes a database of textures, and said processing element determines a texture and displays the texture.

8. A method of displaying a video, comprising:
receiving video information having a first ratio of length to width into a video device; and
automatically determining additional video information for display on a display with a second, different ratio between length and width than said first ratio, said automatically determining obtaining information indicative of at least a first characteristic of the video information in at least a portion of said video information, said first characteristic being a viewable characteristic that effects the look of the video information when displayed, and where said additional video information has a non-constant luminance, but has an average luminance that is matched to an average luminance of a portion of said video information; and displaying said video information and said additional video information on said display device wherein said additional video information is obtained by accessing a database of additional video information using said information indicative of said viewable characteristic,
said additional video information being selected from said database based on said information indicative of said viewable characteristic, wherein said first characteristic is a first texture in at least said portion, and said automatically determines obtains said additional video information from said database having a determined texture that matches to said first texture.

9. A method as in claim 8, wherein said first characteristic is a first color in at least said portion, and where said automatically determining finds said additional video information having a determined color related to said first color.

10. A method as in claim 9, wherein said additional video information matches to a median color which is found most often in said portion.

11. A method as in claim 9, wherein said additional video information matches to an average color in said portion.

12. A method as in claim 8, wherein said additional video information is obtained by calculating said average luminance value representative of said additional video information based on said information indicative of said viewable characteristic.

13. An apparatus, comprising:
a connection to a display, and a processing element, which receives video information as an input thereto, said video information having a first ratio between length and width of the video information, and said processing element operating to automatically determine additional video information for display on the display with a second, different ratio between length and width than said first ratio, wherein said processing element processes at least a portion of the video information to determine information indicative of at least both of a color in said portion and a texture in said portion, and where said processing element automatically determines said additional video information having at least one characteristic that matches to both said color and said texture and outputs said additional video information on said connection.

14. An apparatus as in claim 13, wherein said processing element obtains said additional video information by calculating an average luminance value representative of said additional video information based on said information indicative of at least both of a color in said portion and a non-constant texture in said portion.

15. An apparatus as in claim 13, wherein said processing element obtains said additional video information by accessing a database of additional video information using said information indicative of said viewable characteristic, said additional video information being selected by said processing element from said database based on said information indicative of said viewable characteristic.

* * * * *